US012559201B2

(12) United States Patent
Morfino

(10) Patent No.: US 12,559,201 B2
(45) Date of Patent: Feb. 24, 2026

(54) HYBRID DRIVE SNOWMOBILE AND HYBRIDIZATION KIT FOR A SNOWMOBILE

(71) Applicant: EFESTO S.A.R.L., Paris (FR)

(72) Inventor: Luca Morfino, Pino Torinese (IT)

(73) Assignee: EFESTO S.A.R.L., Paris (FR)

( * ) Notice: Subject to any disclaimer, the term of this patent is extended or adjusted under 35 U.S.C. 154(b) by 0 days.

(21) Appl. No.: 18/556,465

(22) PCT Filed: Apr. 28, 2022

(86) PCT No.: PCT/IB2022/053953
§ 371 (c)(1),
(2) Date: Oct. 20, 2023

(87) PCT Pub. No.: WO2022/229897
PCT Pub. Date: Nov. 3, 2022

(65) Prior Publication Data
US 2024/0182135 A1    Jun. 6, 2024

(30) Foreign Application Priority Data

Apr. 28, 2021    (IT) ......................... 102021000010769

(51) Int. Cl.
*B62M 23/02* (2010.01)
*B62M 27/02* (2006.01)

(52) U.S. Cl.
CPC ............ *B62M 27/02* (2013.01); *B62M 23/02* (2013.01)

(58) Field of Classification Search
CPC . B62M 27/02; B62M 23/02; B62M 2027/023
See application file for complete search history.

(56) References Cited

U.S. PATENT DOCUMENTS

| | | | | |
|---|---|---|---|---|
| 7,290,629 | B2 * | 11/2007 | Ozeki ................... | B60K 6/543 |
| | | | | 180/65.23 |
| 8,919,479 | B1 * | 12/2014 | Langlands ............ | B62M 11/04 |
| | | | | 180/219 |
| 9,500,264 | B2 * | 11/2016 | Aitcin ................... | B62M 27/02 |
| 9,533,562 | B2 * | 1/2017 | Märkl ...................... | F16H 3/724 |
| 10,293,883 | B1 | 5/2019 | Bedard et al. | |

(Continued)

FOREIGN PATENT DOCUMENTS

| | | | | | |
|---|---|---|---|---|---|
| EP | 1270302 B1 * | 5/2006 | ............. | F16D 43/18 |
| EP | 1705784 A2 * | 9/2006 | ............... | B60K 6/48 |

(Continued)

OTHER PUBLICATIONS

International Search Report and Written Opinion in PCT/IB2022/053953, mailed Jul. 22, 2022, (11 pages).

*Primary Examiner* — Sherry L Estremsky
(74) *Attorney, Agent, or Firm* — Leason Ellis LLP

(57)    ABSTRACT

Hybrid drive snowmobile comprising an IC engine, a variable speed drive comprising a first pulley connected to a drive shaft of the IC engine, a second pulley and a belt coupled to the first and second pulleys, an intermediate shaft-connected to the second pulley of the variable speed drive, an output shaft connected to the intermediate shaft by a transmission and a drive wheel of a motor track of the snowmobile connected to the output shaft and a reversible electrical machine connected to the intermediate shaft.

19 Claims, 3 Drawing Sheets

(56)  References Cited

U.S. PATENT DOCUMENTS

| 2010/0025131 | A1* | 2/2010 | Gloceri | B60K 6/52 |
| | | | | 180/65.265 |
| 2020/0166115 | A1 | 5/2020 | Aitcin | |
| 2021/0009235 | A1* | 1/2021 | Okada | B62J 50/225 |
| 2021/0362806 | A1* | 11/2021 | Hedlund | B62M 27/02 |
| 2022/0250715 | A1* | 8/2022 | LeBlanc | B60L 50/15 |

FOREIGN PATENT DOCUMENTS

| EP | 3147192 | A2 * | 3/2017 | B60K 1/04 |
| EP | 3640080 | A1 * | 4/2020 | B60K 6/26 |
| FR | 3024971 | A1 * | 2/2016 | B60K 6/383 |
| IT | 2018 0001 0046 | | 5/2020 | |
| RU | 155733 | U1 * | 10/2015 | |
| WO | 2017072743 | | 5/2017 | |
| WO | WO-2017135315 | A1 * | 8/2017 | B60W 10/08 |
| WO | 2018112642 | | 6/2018 | |

* cited by examiner

HYBRID DRIVE SNOWMOBILE AND HYBRIDIZATION KIT FOR A SNOWMOBILE

CROSS-REFERENCE TO RELATED APPLICATIONS

This Patent Application is a U.S. National Phase Application under 35 U.S.C. § 371 of International Patent Application No. PCT/IB2022/053953, filed on Apr. 28, 2022, which claims priority from Italian Patent Application No. 102021000010769, filed on Apr. 28, 2021, all of which are incorporated by reference, as if expressly set forth in their respective entireties herein.

TECHNICAL FIELD OF THE INVENTION

The present invention relates to a hybrid drive snowmobile and to a hybridization kit for a snowmobile.

STATE OF THE ART

As is known, the need to reduce consumption and emissions has led to an increasingly greater diffusion of the hybrid drive in the automotive field.

In the field of snowmobiles, the hybrid drive is not yet widespread, therefore the known snowmobiles are either provided with an IC engine only or are purely electrical.

The use of snowmobiles provided only with the IC engine, besides entailing high consumption, is forbidden in some protected areas due to environmental and acoustic pollution issues.

On the other hand, the purely electrical snowmobiles have a very heavy battery pack, high weight and price, limited autonomy and dynamic performance. Therefore, the need is felt to integrate an IC engine and an electrical machine so as to allow various driving modes with optimal performance and safety conditions.

SUBJECT AND SUMMARY OF THE INVENTION

The object of the present invention is to manufacture a hybrid drive snowmobile, which allows solving the aforementioned problems.

According to an embodiment of the present disclosure, there is provided a hybrid drive snowmobile comprising an IC engine, a variable speed drive comprising a first pulley connected to a drive shaft of the IC engine, a second pulley and a belt coupled to the first and second pulleys, an intermediate shaft connected to the second pulley of the variable speed drive, an output shaft connected to the intermediate shaft by a transmission and a drive wheel of a motor track of the snowmobile connected to the output shaft and an electrical machine rotationally coupled to the intermediate shaft and selectively operable as a motor and as a regenerative brake.

According to a further embodiment of the present disclosure, there is provided a hybrid drive snowmobile comprising an IC engine, a variable speed drive comprising a first pulley connected to a drive shaft of the IC engine, a second pulley and a belt coupled to the first and second pulleys, an intermediate shaft connected to the second pulley of the variable speed drive, an output shaft connected to the intermediate shaft by a transmission and a drive wheel (31) of a motor track of the snowmobile connected to the output shaft and a reversible electrical machine rotationally coupled to the intermediate shaft and selectively operable as a motor and as a regenerative brake, wherein the electrical machine comprises a rotor rigidly coupled to the intermediate shaft.

According to a further embodiment of the present disclosure, there is provided a hybrid drive snowmobile comprising an IC engine, a variable speed drive comprising a first pulley connected to a drive shaft of the IC engine, a second pulley and a belt coupled to the first and second pulleys, an intermediate shaft connected to the second pulley of the variable speed drive, an output shaft connected to the intermediate shaft by a transmission and a drive wheel of a motor track of the snowmobile connected to the output shaft (30) and a reversible electrical machine rotationally coupled to the intermediate shaft and selectively operable as a motor and as a regenerative brake, further comprising a control unit configured to vary both a driving and a braking torque of the electrical machine in response to input signals received from on-board sensors.

According to a further aspect of the present disclosure, there is provided a hybridization kit for a snowmobile, the snowmobile comprising an IC engine, a variable speed drive comprising a first pulley connected to a drive shaft of the IC engine, a second pulley and a belt coupled to the first and second pulleys, an intermediate shaft connected to the second pulley of the variable speed drive, an output shaft connected to the intermediate shaft by a transmission and a drive wheel of a motor track of the snowmobile connected to the output shaft, the kit comprising: —a reversible electrical machine configured to be rotationally coupled to the intermediate shaft of the snowmobile; a control unit configured to vary both a driving and a braking torque of the electrical machine in response to input signals received from a position sensor of the snowmobile, a rearing angle sensor, an angular velocity sensor of the motor track, and an acceleration sensor of the snowmobile;
a battery pack; and
an inverter.

BRIEF DESCRIPTION OF THE DRAWINGS

In order to better understand the present invention, a preferred embodiment is described in the following, by way of a non-limiting example and with reference to the accompanying drawings, wherein.

DETAILED DESCRIPTION OF PREFERRED EMBODIMENTS OF THE INVENTION

Figure 1:
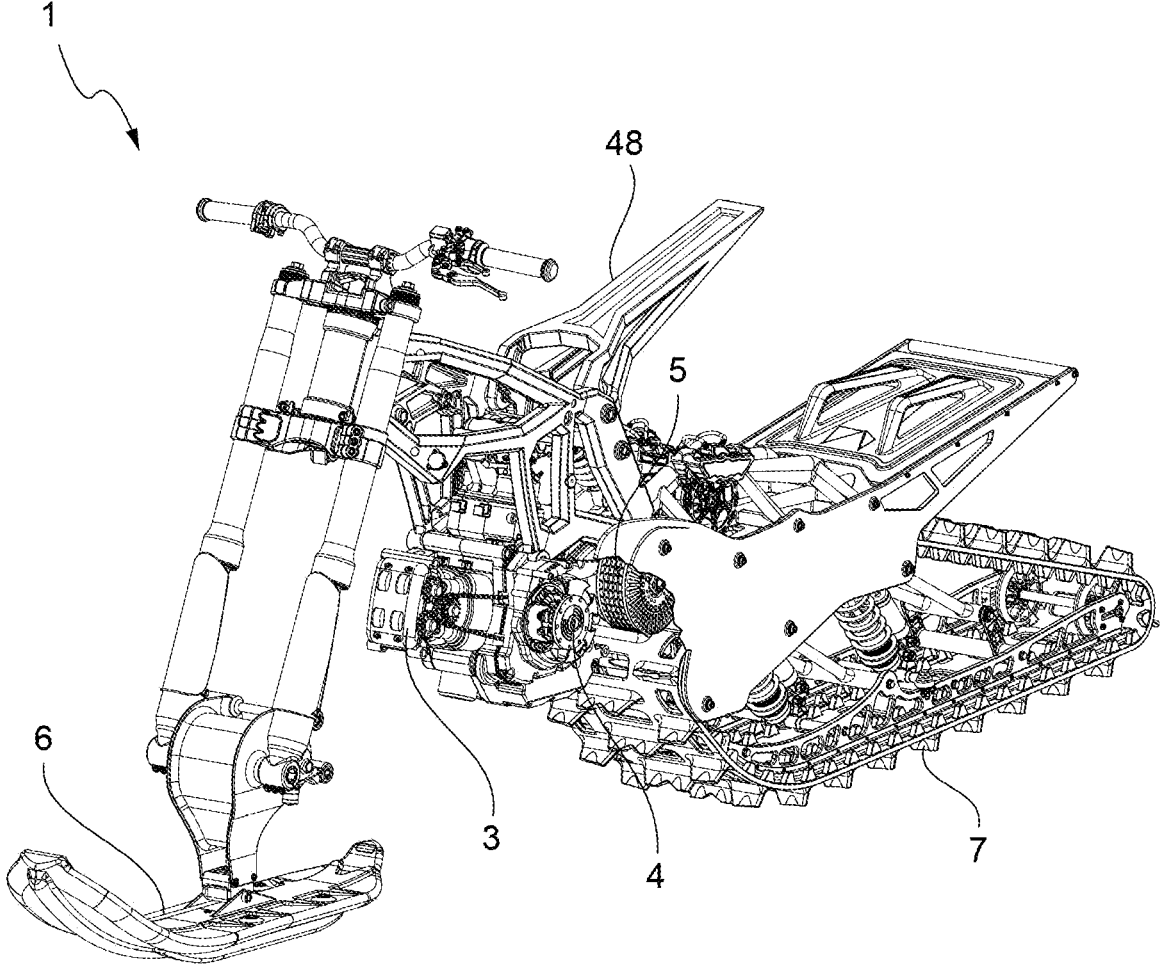
FIG. 1 is a perspective view of a snowmobile according to the present invention.

FIG. 1 illustrates a hybrid drive snowmobile 1 manufactured according to the present invention.

The snowmobile 1 comprises a fairing inside which there is a powerplant 2 comprising an IC engine 3, a variable speed drive 4, and a reversible electrical machine 5. The snowmobile 1 is further provided with skids 6 at the front and with a motor track 7 at the back.

The IC engine 3 is provided with a drive shaft 8 having an axis A thereof perpendicular to a median longitudinal plane of the vehicle, and to which the variable speed drive 4 is connected at the output.

US 12,559,201 B2

3

Figure 2:
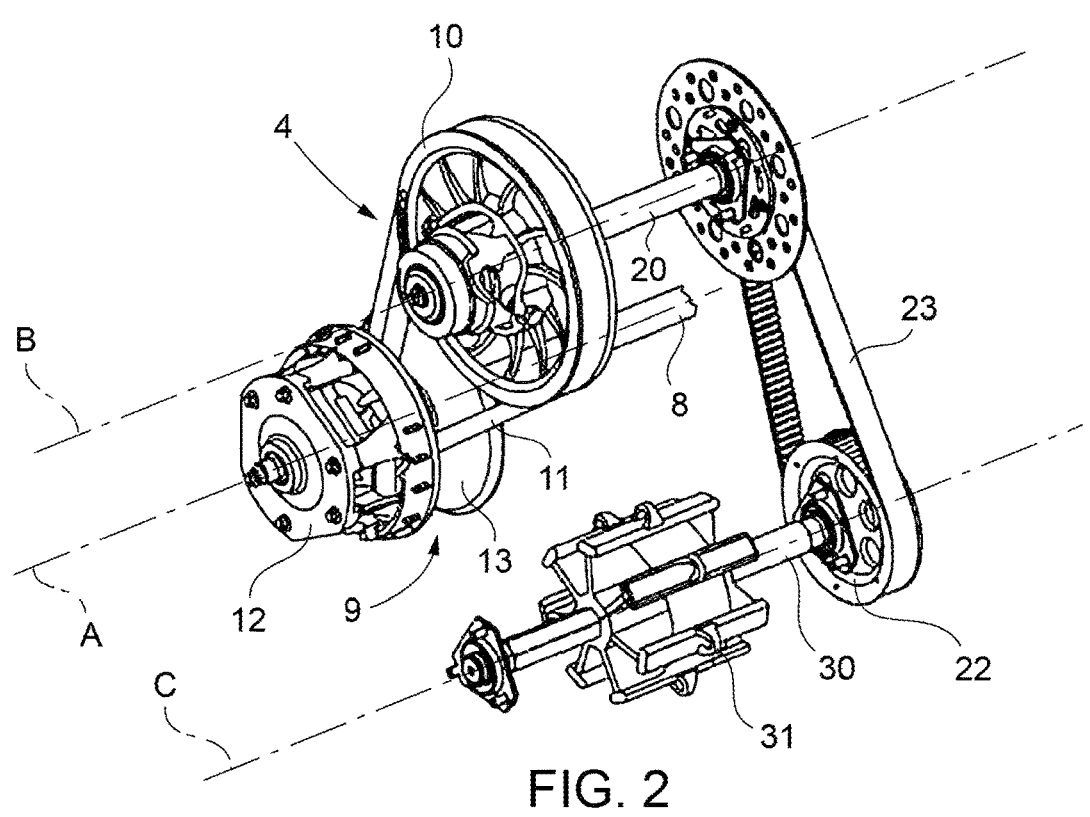
FIG. 2 is a perspective view of a detail of a driving unit of the snowmobile of FIG. 1.

The variable speed drive 4 (FIG. 2) comprises a first pulley 9, a second pulley 10 and a belt 11 with a trapezoidal section wound on the pulleys.

The first pulley 9 comprises two conical half-pulleys 12, 13 facing each other and rotationally coupled to the drive shaft 8 of the IC engine 3. The pulley 9 has a variable transmission ratio, since the half-pulleys 12, 13 have a variable relative distance in an axial direction as a function of the speed of the drive shaft 8, in a manner known per se. In particular, the lower the speed of the drive shaft 8, the greater the relative distance in the axial direction between the half-pulleys 12, 13.

The first pulley 9 gives the motion to the second pulley 10 by means of the belt 11. In particular, the belt 11 engages between the pulleys 12, 13 working by friction on the sides. The greater the relative distance in the axial direction between the pulleys 12, 13, the smaller the diameter of the first pulley 9, and thus the smaller the transmission ratio intended as the ratio between the angular velocity of the second pulley 10 and that of the first pulley 9.

The second pulley 10 is angularly coupled to one end of an intermediate shaft 20, having an axis B thereof parallel to the axis A.

The intermediate shaft 20 integrally carries, at an opposite end thereof, a pulley 21 which gives the motion to a pulley 22 keyed on an output shaft 30, having an axis C thereof parallel to the axis B by means of, for example, a toothed belt 23.

On the output shaft 30 a drive wheel 31 is keyed which meshes with the drive track 7 of the snowmobile 1.

Figure 3:
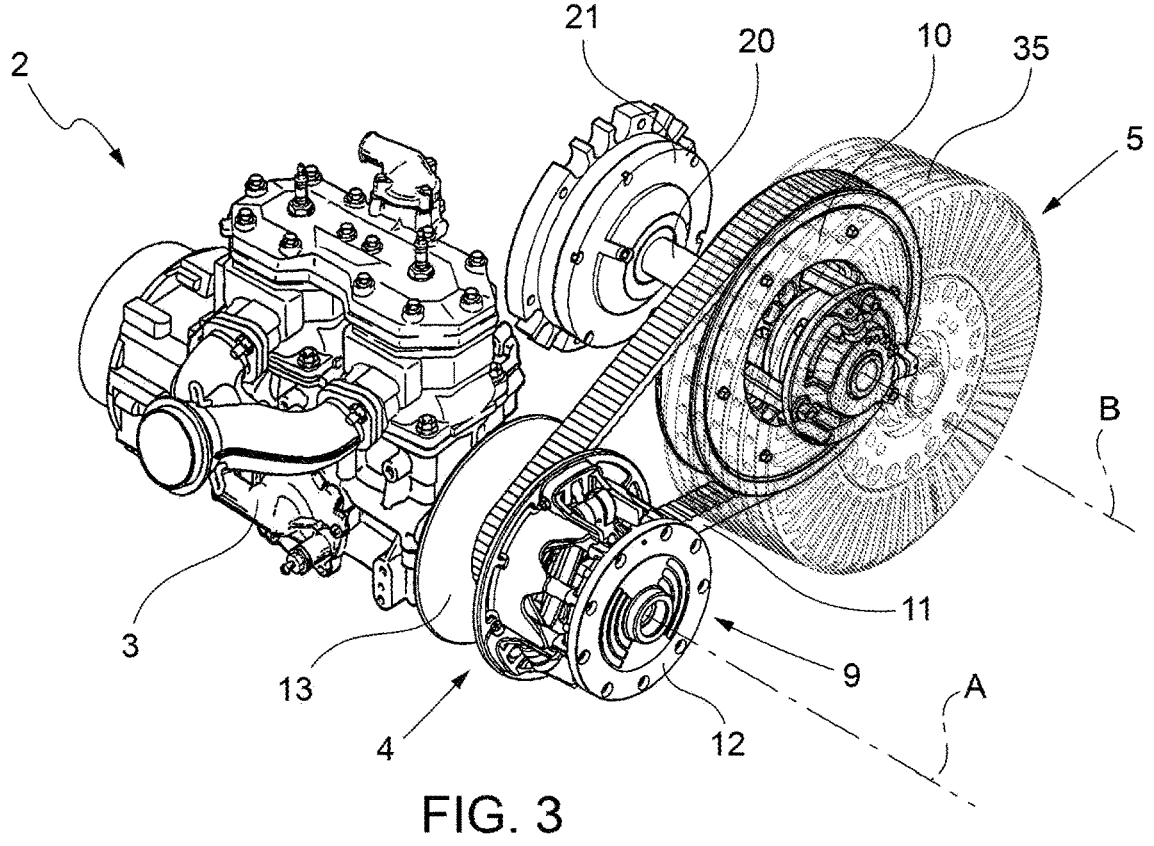
FIG. 3 is a perspective view of a different detail of the driving unit of FIG. 2.

The electrical machine 5 (FIG. 3) is permanently or selectively connected to the intermediate shaft 20, on the side of the pulley 10 or of the pulley 21. The electrical machine 5 is preferably an axial flux permanent magnet electrical machine, with external rotor 35, and is arranged with an axis thereof parallel to axis B.

According to a first embodiment of the invention, the electrical machine 5 is permanently connected to the intermediate shaft 20, on the side of the pulley 10 or of the pulley 21. In particular, the electrical machine 5 is rotationally coupled to the intermediate shaft 20. Preferably, the rotor 35 of the electrical machine is rigidly coupled to the pulley 10 or to the pulley 21, and the axis of the electrical machine 5 coincides with the axis B.

According to an embodiment variation (not illustrated) of the present invention, a decoupler assembly is further provided, configured to selectively connect the electrical machine 5 to the intermediate shaft 20.

Figure 4:
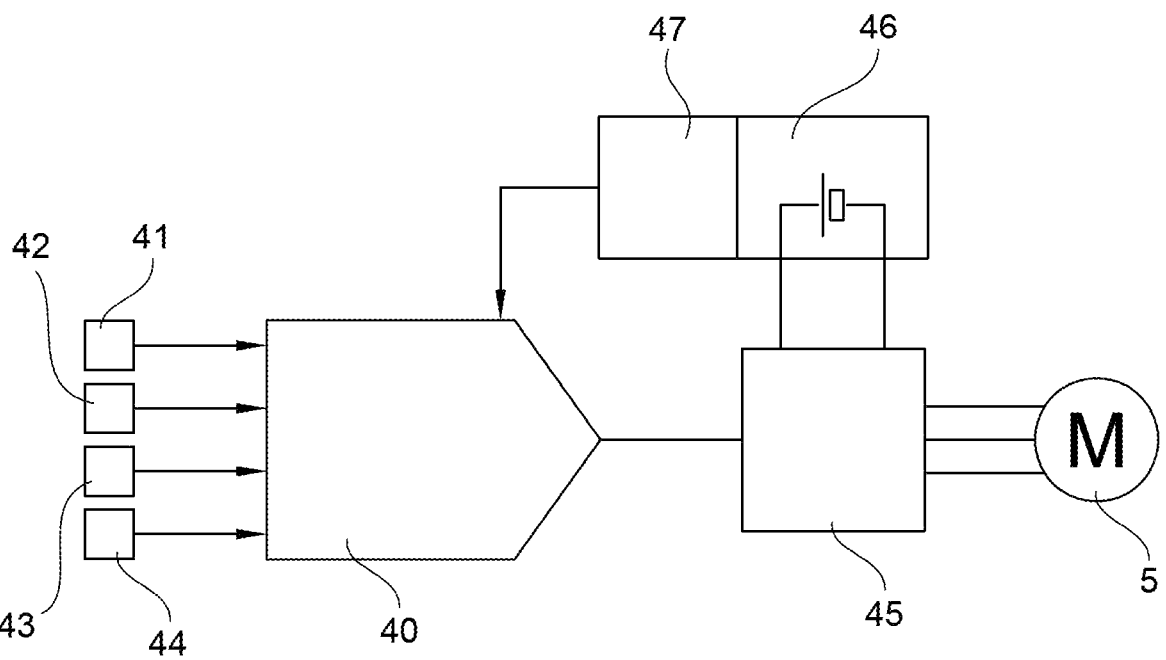
FIG. 4 is a block diagram of the control of an electrical machine of the snowmobile of FIG. 1.

FIG. 4 illustrates a block diagram of the control of the electrical machine.

A microprocessor control unit 40 receives input signals from a plurality of on-board sensors, among which—with reference to the functions of interest herein—a position sensor 41 of the snowmobile 1 (preferably a GPS tracker), an inclination or rearing sensor 42, an angular velocity sensor 43 of the drive wheel 31 of the motor track 7, and an acceleration sensor 44 of the snowmobile 1.

The control unit 40 sends control signals to an inverter 45 associated with the electrical machine 5, which is connected to a battery pack 46 provided with a management system (BMS) 47 which communicates with the control unit 40. Conveniently, the inverter 45 is inside the fairing and housed between the powerplant 2 and the battery pack 46, which is conveniently fixed in the rear part of the snowmobile 1, preferably behind the saddle 48.

The operation of the hybrid drive system of the snowmobile 1 is as follows.

4

1. IC Mode

By turning off the electrical machine 5, the snowmobile 1 is dragged in a conventional way by the IC engine 3 only. If the decoupler assembly is present, the electrical machine 5 is excluded from the kinematic chain.

2. Electrical Mode

By turning off the IC engine 3, the snowmobile 1 is dragged by the electrical machine 5 only. Since the speed of the drive shaft 8 is equal to zero, the relative distance in the axial direction between the half-pulleys 12, 13 is maximum and such that they do not press axially on the sides of the belt 11, and are not dragged by the latter. Therefore, the IC engine 3 is isolated and does not introduce any inertia to the undesired rotation. When braking, the electrical machine is used as a regenerative brake for recharging the battery pack 46.

3. Hybrid Mode

In this mode, both the IC engine 3 and the electrical machine 5 are used simultaneously, thus making it possible to obtain the sum of the driving powers ("boost") or of the braking powers. The control unit 40 divides the torque between the IC engine 3 and the electrical machine 5 on the basis of stored maps as a function of the input signals, and in particular of the speed, of the power request and of the load. Also in this case, the electrical machine 5 can be used as a regenerative brake for recharging the battery pack 46.

In this mode, complex control strategies can be implemented in particular operational situations which are identified on the basis of the input signals, such as the following:

a. Anti-Rearing Control

The condition of incipient rearing can be detected as a sudden variation of the inclination signal generated by the sensor 42. In particular, the condition can be detected by comparing the derivative with respect to the time of the value of such signal with a predetermined threshold value, at the exceeding of which the electrical machine 5 is made to operate as a regenerative brake for reducing the power discharged on the motor track 7. The electrical machine 5 can return delivering driving torque when an inclination reduction condition is detected. This function can thus be carried out in a simple way without intervening on the control maps of the IC engine 3.

b. Anti-Spinning Control

The condition of spinning, i.e. of loss of adhesion of the motor track 7, can be detected by comparing the signal generated by the angular velocity sensor 43 with that obtained by processing the signals of the position sensor 41 and of the acceleration sensor 44 of the snowmobile 1. In particular, the instantaneous speed of the motor track 7 is obtained from the angular velocity sensor 43, whereas the instantaneous speed of the snowmobile 1 is obtained by adding the contribution of the average speed, obtained by sampling the position through the position sensor 41, and the contribution due to any instantaneous acceleration, measured by the acceleration sensor 44. If the instantaneous speed of the motor track 7 exceeds that of the snowmobile 1 by a predetermined amount, the electrical machine 5 is used as a regenerative brake for reducing the speed of the motor track 7 and bringing it back into adhesion conditions. The electrical machine 5 can return delivering driving torque when the difference between the instantaneous speed of the motor track 7 and that of the snowmobile 1 is less than the predetermined amount.

From an examination of the features of the snowmobile 1, the advantages of the present invention are evident.

In particular, the presence of the variable speed drive 4, together with the fact that the electrical machine 5 is connected to the intermediate shaft 20, allows completely excluding the IC engine 3 in purely electrical driving mode by simply switching off the IC engine 3. In fact, in this situation the variable speed drive 4 decouples the IC engine 3 from the electrical machine 5, avoiding the use of a decoupling clutch.

Such arrangement further allows entrusting the electrical machine 5 with active anti-rearing or anti-spinning control functions by exerting a braking torque and at the same time recharging the battery without having to intervene on the control of the IC engine 3.

According to an embodiment of the invention, the electrical machine 5 can be selectively connectable to the intermediate shaft 20. In this way, in IC mode it is possible to completely exclude the electrical machine 5 avoiding the dragging of relevant masses.

Thanks to its features, when compared with a conventional snowmobile provided with only the IC engine with the same performances, the hybrid drive snowmobile 1 entails lower consumption, which is reflected in a reduction in emissions. At the same time, the snowmobile 1 does not have the aforementioned disadvantages typical of the purely electrical snowmobiles, in particular limited autonomy and dynamic performance.

Finally, it is clear that modifications and variations may be made to the snowmobile 1 without departing from the scope of protection defined by the claims.

The electrical machine 5 and the relative control and power supply means (control unit 40, inverter 45 and battery pack 46) can also be supplied separately as a hybridization kit applicable to a conventional snowmobile provided with the IC engine only.

Conveniently, the kit can comprise a voltage converter of the DC-DC type, and an additional water pump.

The voltage converter is used to manage the different voltage levels necessary for the operation of the hybrid system.

The additional water pump is used for cooling the electrical machine and the inverter. In fact, since the electrical machine can operate independently of the IC engine, it must be cooled by its own cooling circuit.

Due to the modifications to be made for the hybridization of a conventional snowmobile provided with the IC engine only, a new fairing may be necessary which replaces the one normally present.

Finally, the features of the snowmobile described in combination with each other can be used independently, and according to different combinations.

The invention claimed is:

1. Hybrid drive snowmobile comprising an IC engine (3), a variable speed drive (4) comprising a first pulley (9) permanently connected to a drive shaft (8) of the IC engine (3) in a rotationally fixed manner, a second pulley (10) and a belt (11) coupled to the first and second pulleys (9, 10), an intermediate shaft (20) permanently connected to the second pulley (10) of the variable speed drive (4) in a rotationally fixed manner, an output shaft (30) connected to the intermediate shaft (20) by a transmission (21, 22, 23) and a drive wheel (31) of a motor track (7) of the snowmobile (1) connected to the output shaft (30), an electrical machine (5) rotationally coupled to the intermediate shaft (20) and selectively operable as a motor and as a regenerative brake, wherein the electrical machine (5) comprises a rotor (35) rigidly coupled to the intermediate shaft (20) and wherein the first pulley (9) of the variable speed drive (4) includes two half-pulleys (12, 13) whose relative distance in an axial direction is such that the IC engine (3) is decoupled from the electrical machine (5) when the IC engine (3) is off.

2. Snowmobile as claimed in claim 1, comprising an inverter (45) connected to the electrical machine (5).

3. Snowmobile as claimed in claim 1, comprising a control unit (40) configured to vary both a driving and a braking torque of the electrical machine (5) in response to input signals received from on-board sensors (41, 42, 43, 44).

4. Snowmobile as claimed in claim 3, wherein the on-board sensors comprise a position sensor (41) of the snowmobile (1), an angular velocity sensor (43) of the motor track (7), and an acceleration sensor (44) of the snowmobile (1).

5. Snowmobile as claimed in claim 4, wherein said control unit (40) is configured to perform an anti-spinning control in which the electrical machine (5) generates a braking torque when the instantaneous speed of the motor track (7) exceeds the instantaneous speed of the snowmobile (1) by a predetermined amount, the instantaneous speed of the motor track (7) being calculated based on signals received from the angular velocity sensor (43) of the motor track (7), and the instantaneous speed of the snowmobile (1) being calculated based on signals received from the position sensor (41) and the acceleration sensor (44) of the snowmobile (1).

6. Snowmobile as claimed in claim 3, comprising a rearing angle sensor (42).

7. Snowmobile as claimed in claim 6, wherein said control unit (40) is configured to perform a rearing control in which the electrical machine (5) generates a braking torque as a function of the derivative of the rearing angle.

8. Hybridization kit for a snowmobile, the snowmobile comprising an IC engine (3), a variable speed drive (4) comprising a first pulley (9) connected to a drive shaft (8) of the IC engine (3), a second pulley (10) and a belt (11) coupled to the first and second pulleys (9, 10), an intermediate shaft (20) connected to the second pulley (10) of the variable speed drive (4), an output shaft (30) connected to the intermediate shaft (20) by a transmission (21, 22, 23) and a drive wheel (31) of a motor track (7) of the snowmobile (1) connected to the output shaft (30), the kit comprising:

an electrical machine (5) configured to be rotationally coupled to the intermediate shaft (20) of the snowmobile, a control unit (40) configured to vary both a driving and a braking torque of the electrical machine (5) in response to input signals received from a position sensor (41) of the snowmobile (1), a rearing angle sensor (42), an angular velocity sensor (43) of the motor track (7), and an acceleration sensor (44) of the snowmobile (1);

a battery pack (46); and an inverter (45).

9. Kit as claimed in claim 8, wherein said control unit (40) is configured to perform an anti-spinning control in which the electrical machine (5) generates a braking torque based on signals received from the angular velocity sensor (43) of the motor track (7), the position sensor (41) and the acceleration sensor (44) of the snowmobile (1).

10. Kit as claimed in claim 8, wherein said control unit (40) is configured to perform a rearing control in which the electrical machine (5) generates a braking torque as a function of a signal received from the rearing angle sensor (42).

11. Kit as claimed in claim 8, comprising a DC-DC voltage converter.

12. Kit as claimed in claim 8, comprising an additional water pump for cooling the electrical machine (5).

13. Hybrid drive snowmobile comprising an IC engine (3), a variable speed drive (4) comprising a first pulley (9) connected to a drive shaft (8) of the IC engine (3), a second pulley (10) and a belt (11) coupled to the first and second pulleys (9, 10), an intermediate shaft (20) connected to the second pulley (10) of the variable speed drive (4), an output shaft (30) connected to the intermediate shaft (20) by a transmission (21, 22, 23) and a drive wheel (31) of a motor track (7) of the snowmobile (1) connected to the output shaft (30), an electrical machine (5) rotationally coupled to the intermediate shaft (20) and selectively operable as a motor and as a regenerative brake, and a decoupler assembly configured to selectively connect the electrical machine (5) to the intermediate shaft (20).

14. Snowmobile as claimed in claim 13, comprising an inverter (45) connected to the electrical machine (5).

15. Snowmobile as claimed in claim 13, comprising a control unit (40) configured to vary both a driving and a braking torque of the electrical machine (5) in response to input signals received from on-board sensors (41, 42, 43, 44).

16. Snowmobile as claimed in claim 15, wherein the on-board sensors comprise a position sensor (41) of the snowmobile (1), an angular velocity sensor (43) of the motor track (7), and an acceleration sensor (44) of the snowmobile (1).

17. Snowmobile as claimed in claim 16, wherein said control unit (40) is configured to perform an anti-spinning control in which the electrical machine (5) generates a braking torque when the instantaneous speed of the motor track (7) exceeds the instantaneous speed of the snowmobile (1) by a predetermined amount, the instantaneous speed of the motor track (7) being calculated based on signals received from the angular velocity sensor (43) of the motor track (7), and the instantaneous speed of the snowmobile (1) being calculated based on signals received from the position sensor (41) and the acceleration sensor (44) of the snowmobile (1).

18. Snowmobile as claimed in claim 15, comprising a rearing angle sensor (42).

19. Snowmobile as claimed in claim 18, wherein said control unit (40) is configured to perform a rearing control in which the electrical machine (5) generates a braking torque as a function of the derivative of the rearing angle.

\*   \*   \*   \*   \*